(12) United States Patent
Tamas et al.

(10) Patent No.: US 7,984,168 B2
(45) Date of Patent: Jul. 19, 2011

(54) METHOD AND SYSTEM FOR OPERATION OF A COMPUTER NETWORK INTENDED FOR THE PUBLICATION OF CONTENT

(75) Inventors: Alexis Tamas, Paris (FR); Amaury Grimbert, Boulogne-Billancourt (FR)

(73) Assignee: STG Interactive, Paris (FR)

( * ) Notice: Subject to any disclaimer, the term of this patent is extended or adjusted under 35 U.S.C. 154(b) by 990 days.

(21) Appl. No.: 11/220,368

(22) Filed: Sep. 6, 2005

(65) Prior Publication Data

US 2006/0107035 A1    May 18, 2006

Related U.S. Application Data

(63) Continuation of application No. PCT/FR2005/050019, filed on Jan. 13, 2005.

(30) Foreign Application Priority Data

Jan. 14, 2004 (FR) .................................... 04 50079

(51) Int. Cl.
  *G06F 15/16* (2006.01)
  *G06F 15/177* (2006.01)
  *H04L 29/06* (2006.01)

(52) U.S. Cl. ........ 709/229; 709/227; 709/230; 709/237; 713/1; 713/156; 726/4

(58) Field of Classification Search ........ 701/1; 705/37, 705/39, 59, 80; 707/10, 100; 709/227, 230, 709/237; 713/172, 189, 202, 1, 156; 714/4; 715/255, 501.1; 718/105; 370/395.32, 401; 726/4

See application file for complete search history.

(56) References Cited

U.S. PATENT DOCUMENTS

| | | | | |
|---|---|---|---|---|
| 5,247,683 | A | * | 9/1993 | Holmes et al. ................ 709/221 |
| 5,978,779 | A | * | 11/1999 | Stein et al. ...................... 705/37 |
| 6,003,030 | A | * | 12/1999 | Kenner et al. ................... 707/10 |
| 6,108,308 | A | * | 8/2000 | Flavin et al. ................... 370/238 |
| 6,327,622 | B1 | * | 12/2001 | Jindal et al. ................... 709/228 |
| 6,427,140 | B1 | * | 7/2002 | Ginter et al. .................... 705/80 |
| 6,587,866 | B1 | * | 7/2003 | Modi et al. .................... 718/105 |
| 6,667,980 | B1 | * | 12/2003 | Modi et al. ............... 370/395.32 |
| 6,671,818 | B1 | * | 12/2003 | Mikurak ........................... 714/4 |
| 6,735,205 | B1 | * | 5/2004 | Mankude et al. ........ 370/395.32 |

(Continued)

FOREIGN PATENT DOCUMENTS

EP       0 817 444      1/1998

(Continued)

*Primary Examiner* — Carl Colin
*Assistant Examiner* — Peter Shaw
(74) *Attorney, Agent, or Firm* — Harness, Dickey & Pierce, P.L.C.

(57) ABSTRACT

A method of operating a network includes initializing the network using documents signed by a rights manager using a root key; a digital certificate and a document including links to digital pages that are used to access the digital certificate. The digital certificate includes a public part of a network key, which a user uses to access the network. A first digital document including a list of servers is recorded, wherein one of the servers functions as a lookup server. A coefficient representing respective processing capability is assigned to each server. An address is looked up from the lookup server using a first digital document for error management and a second digital document including address parameters. A server is selected based on the address parameters, and digital objects are accessed from the server.

34 Claims, 3 Drawing Sheets

U.S. PATENT DOCUMENTS

| | | | |
|---|---|---|---|
| 6,735,206 B1 * | 5/2004 | Oki et al. | 370/395.32 |
| 6,748,437 B1 * | 6/2004 | Mankude et al. | 709/227 |
| 6,850,985 B1 * | 2/2005 | Giloi et al. | 709/230 |
| 7,389,472 B2 * | 6/2008 | Duncan et al. | 715/255 |
| 2002/0052849 A1 * | 5/2002 | McCutchen et al. | 705/59 |
| 2002/0083095 A1 * | 6/2002 | Wu et al. | 707/513 |
| 2003/0088827 A1 * | 5/2003 | Tamas et al. | 715/501.1 |
| 2003/0120593 A1 * | 6/2003 | Bansal et al. | 705/39 |
| 2003/0187821 A1 * | 10/2003 | Cotton et al. | 707/1 |
| 2004/0003251 A1 * | 1/2004 | Narin et al. | 713/172 |
| 2004/0064710 A1 * | 4/2004 | Vainstein | 713/189 |
| 2005/0002405 A1 * | 1/2005 | Gao | 370/401 |
| 2005/0028154 A1 * | 2/2005 | Smith et al. | 717/176 |

FOREIGN PATENT DOCUMENTS

WO    WO 01/95147    12/2001

* cited by examiner

METHOD AND SYSTEM FOR OPERATION OF A COMPUTER NETWORK INTENDED FOR THE PUBLICATION OF CONTENT

CROSS-REFERENCE TO RELATED APPLICATIONS

This application is a continuation of PCT/FR2005/050019, filed Jan. 13, 2005, which claims priority to French Application No. 04/50079, filed Jan. 14, 2004. Both disclosures of the above applications are incorporated by reference herein.

BACKGROUND AND SUMMARY OF THE INVENTION

This invention relates to the domain of Information and Communication Technologies. This invention is most particularly related to the domain of content publication.

Prior art has already disclosed an electronic multimedia data publishing system as described in patent application PCT WO 01/95147 (STG Interactive SA), comprising a server connected to a computer network and a number of host terminals connected to the computer network, the server including a database wherein are stored digital files containing descriptors of multimedia pages and a software program which manages the database and exchanges with the host terminals, the host terminals being equipped with a random access memory to temporarily store digital files downloaded from the server database and a consultation program to visually display files in accordance with descriptors of a downloaded page, wherein selected digital files include descriptors with at least two visual display modes of the same digital file.

The FSDL (Frogans Slide Description Language) is also a well known easy-to-use XML language that can be used to develop and publish content and manipulate Frogans type computer objects (registered trademark of STG Interactive SA). One fundamental technical problem in the implementation and management of a computer network is to identify the topology of servers and lookup of addresses.

The conventional DNS (Domain Name System) has demonstrated its reliability and robustness over many years. However, this system is not designed so that advanced functions can easily be added to it, particularly concerning descriptions of content and their accessibility. Its main function is the lookup of addresses.

This invention is intended to overcome the disadvantages of prior art by proposing a technical method for the operation of a computer network that is particularly suitable for the publication of content and particularly consulting of computer objects. This method and the associated system have many advantages compared with what is known in prior art. In particular, the method according to the invention has many advanced functions.

Although systems for publication of conventional digital files (for example of Web type) have a free, obscure and almost anarchic organization, the method according to the invention provides a means of obtaining clear referencing and precise naming of the content. The use of a computer network using the method according to the invention enables distributors to have better control over the content that they publish, and distribution of this content. For example, a user could access a descriptive file of a content before loading this content from the server to his specific consultation program, which helps to optimize network resources.

At least three levels of very important advantages of this invention can be immediately distinguished:

User Access

Descriptors can be used for example to indicate whether or not the content is on line, whether or not a filter is present to protect minors from a content specifically aimed at adults, and the method by which the users should authenticate themselves to access the content.

Connection to the Server

For example, descriptors can be used to indicate the connection protocol (http . . . ) and the reference file (home-slide).

Format of Content

For example, descriptors can be used to indicate the version of the publication language used and the encoding format.

Furthermore, the method according to the invention can be used for optimized management of a cache in order to reduce network traffic and improve access time. Thus, the method according to the invention is extremely pleasant for an end-user: it is very simple, very coherent, very ergonomic and does not require any complex technical parameter settings. The invention also has many advantages for the network administrator: he is less in demand by users, so he can focus on more interesting and high level tasks. The network administrator benefits significantly from the invention in terms of productivity, performances and work satisfaction.

The invention also provides a rights manager with control over computer network operators. The rights manager delegates the possibility of managing a network using a digital key called the root key. A network operator will then manage his network using another digital key called the network key. The method according to the invention also provides a means of obtaining the signature of all computer network operation functions, while conventionally it is only possible to obtain the signature of content published through a computer network.

In its most generally accepted version, this invention relates to a method of operating a computer network the said network comprising firstly a number of computer servers and at least one client station on which specific computer software is installed for consulting digital pages, and connecting at least two distinct entities: a rights manager and one or several network operator(s), characterized in that it comprises:

a prior step to initialize the computer network by the means of two digital documents signed by the rights manager using a root key, one being a digital certificate of the said network and the other being a document containing links to digital pages used to access the said digital certificate of the network;

a step to identify the network topology leading to:

obtaining a list of servers L1, recording a digital document containing the said list L1, this digital document being signed by the network operator using a network key, and assignment of a coefficient to each server of the said list L1, that in particular represents its processing capability;

an address lookup step by the means of a server used to resolve addresses (called a lookup server), this step being implemented using two digital documents, one intended for error management and the other containing address parameters, these digital documents being signed by the network operator using the network key;

a step to consult computer objects hosted on the server(s) specified in the address parameters, using the said specific software;

the digital certificate of the computer network initialization step containing administrative and technical type information that the user uses to access the network, the technical information containing in particular the public part of the network key.

Preferably, the method also comprises a prior step to install the specific software for consulting digital pages on the client station. Advantageously, the method also comprises a step to update the specific software for consulting digital pages on the client station, this update being managed by a computer server using a status digital document and an update digital document, these documents being signed by the rights manager using the root key and these documents also being specific to the platform of the client station.

According to one preferred variant, one or several of the said computer servers are dedicated to user technical assistance. According to one particularly advantageous variant, the method implements mechanisms for load balancing between the different servers. According to one preferred execution method, the method uses service re-assignment mechanisms if a server is unavailable. According to one preferred variant, one of the address parameters is a digital filtering indicator taking into account the content of corresponding digital pages, for example but not exclusively in order to manage the authorization to consult these pages in regards to the age of the user.

According to one particular embodiment, the activity of the said operator is taking place on a public network, for example the Internet network. According to another particular embodiment, the activity of the said operator is taking place on at least a private computer network. Preferably, the digital documents have an XML compatible format. Advantageously, the specific software on the client station makes a distinction between different networks during an identification phase and makes simultaneous use of different computer networks possible.

According to one particular variant, the rights manager is divided amongst a number of rights managers. Advantageously, the method implements a cache, for example but not necessarily at the level of the said specific software, for consulting on the client station. Preferably, the said cache has two validity durations: a relative duration starting from a given event and an absolute duration corresponding to a predetermined expiration date.

According to one particular embodiment, the said event is the loading of one of the said digital documents. According to one particularly advantageous embodiment, the list of servers L1 also comprises indicators representing the geographic location of the said servers. According to one particular variant, the step to initialize the computer network is implemented automatically, and is executed using only the said digital certificate.

According to one particular embodiment, the step to initialize the computer network automatically uses predetermined addresses. According to one variant, at the moment of the network topology identification step, the digital document is signed by the rights manager using the network key, this network key then being kept by the rights manager. According to one embodiment, at the moment of the address lookup step, the digital documents are signed by the rights manager using the network key, this network key then being kept by the rights manager. Advantageously, the method also comprises a step to validate the public part of the network key by supplying the signature of a predetermined character string using the network key.

Preferably, each digital document has a unique identifier determined partly by the rights manager and partly by the network operator. According to a first variant, the signature is included in the document, for each digital document. According to a second variant, the signature is referenced by the document and is not included in the document, for each digital document.

According to one preferred embodiment, the address parameters define whether or not a user should authenticate himself or herself to access a content, and if so, the means to be used. Advantageously, the address parameters define the format of the content to be published. According to one particularly advantageous variant, different colors can be used to display the addresses of the different computer networks. According to one preferred variant, the digital document containing the address parameters (lookup document) also contains a certificate to authenticate a content server.

Furthermore, this invention also relates to a method of digital communication between at least two computing equipments on a computer network operated in accordance with the operation method presented above, characterized in that, during at least one of the steps in the method, the digital data exchanged between the two computing equipments comprise at least one address for which the format has a header corresponding to the name of the network and a descriptor determined by a content producer. According to one preferred variant, the step in the method in question is the address lookup step.

Finally, this invention also relates to a computer network operating system, the said network comprising firstly a number of computer servers and at least one client station on which specific software is installed for consulting digital pages, and connecting at least two distinct entities: a rights manager and at least one network operator.

BRIEF DESCRIPTION OF THE DRAWINGS

The invention will be better understood after reading the following purely explanatory description of one embodiment of the invention with reference to the attached Drawings Drawing 1 illustrates an example of a system using the method according to the invention; and Drawings 2 and 3 are diagrams representing document exchange flows between the rights manager, a network operator and the specific software on the user station.

DETAILED DESCRIPTION

Figure 1:
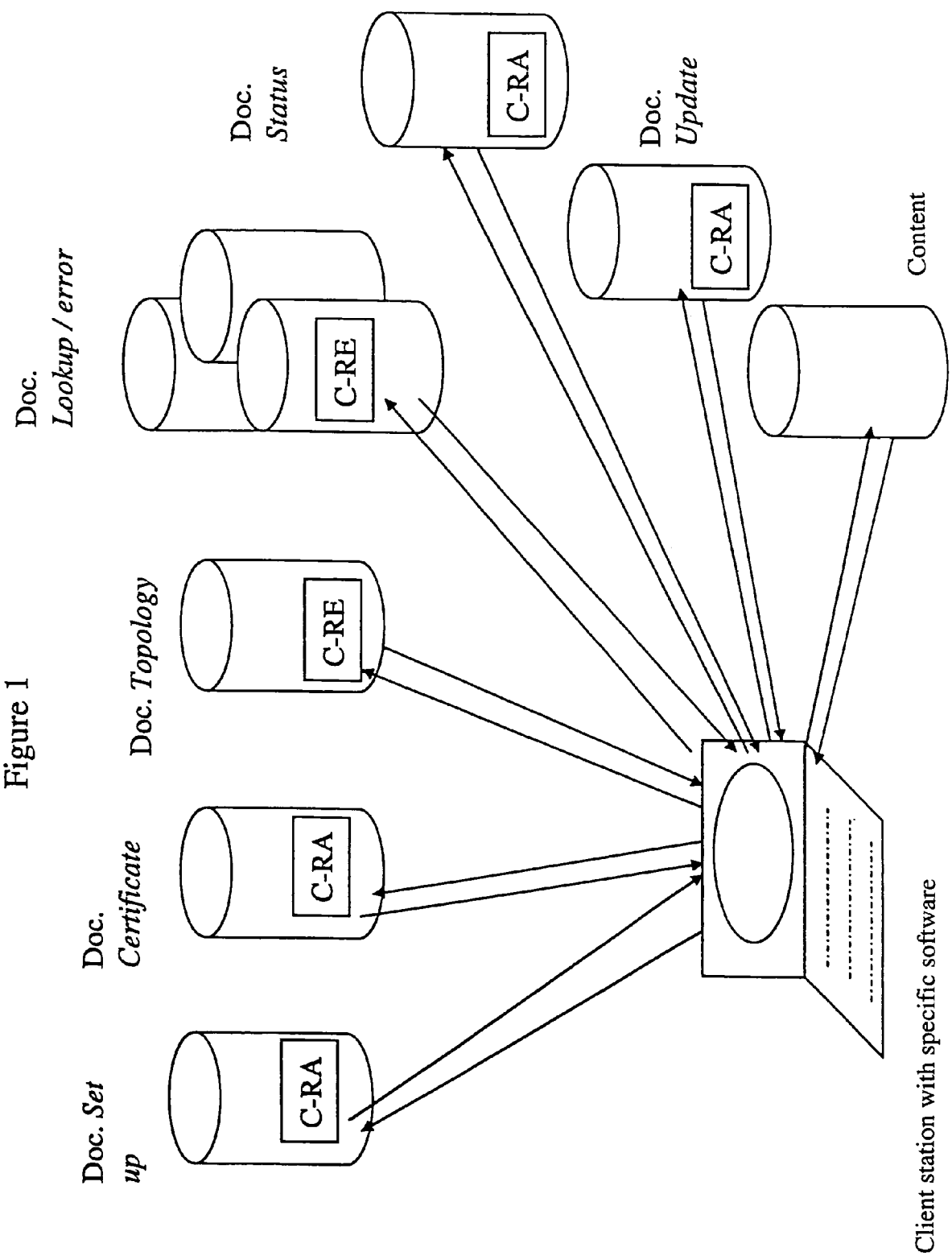
Figure 2:
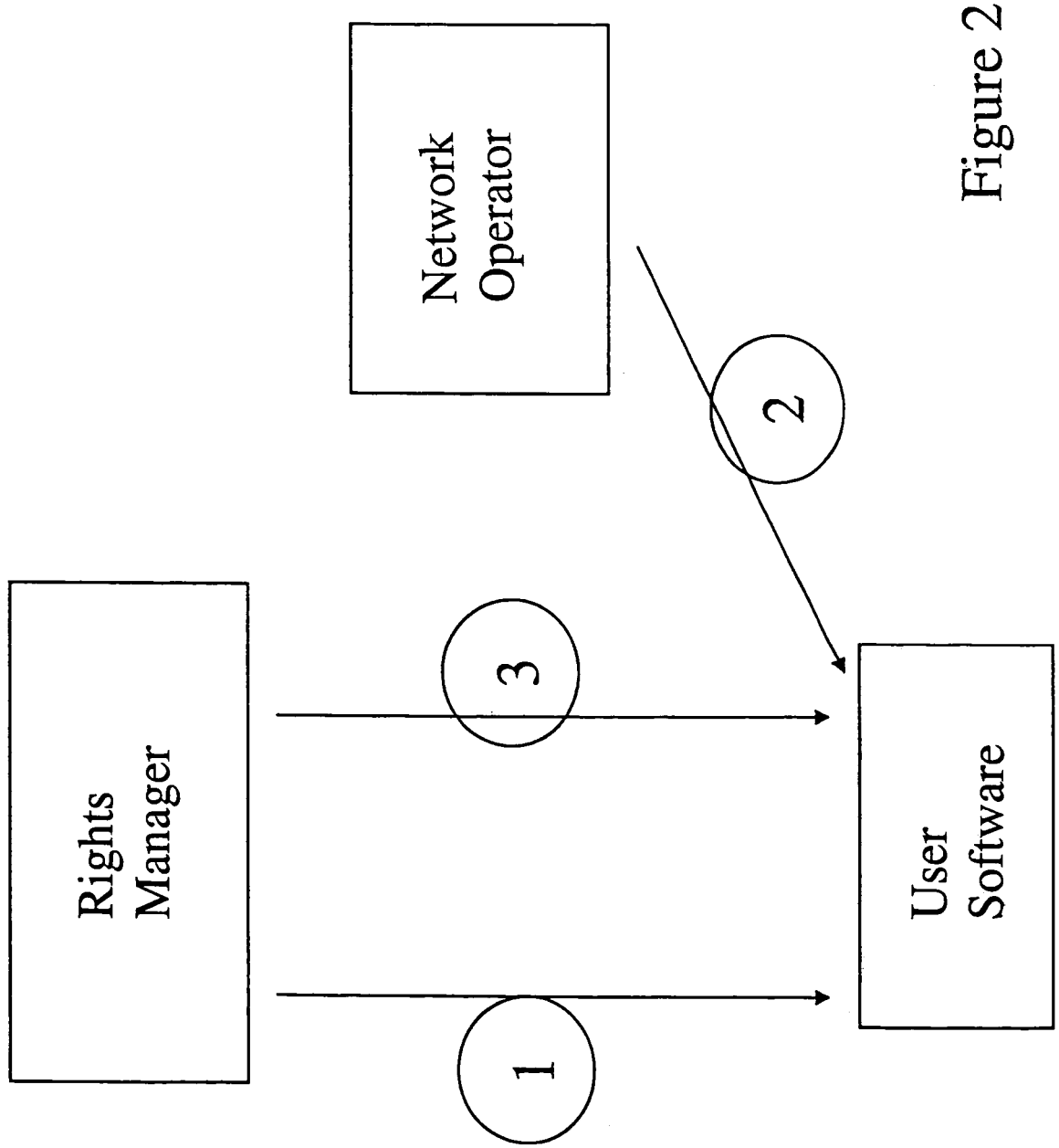
Figure 3:
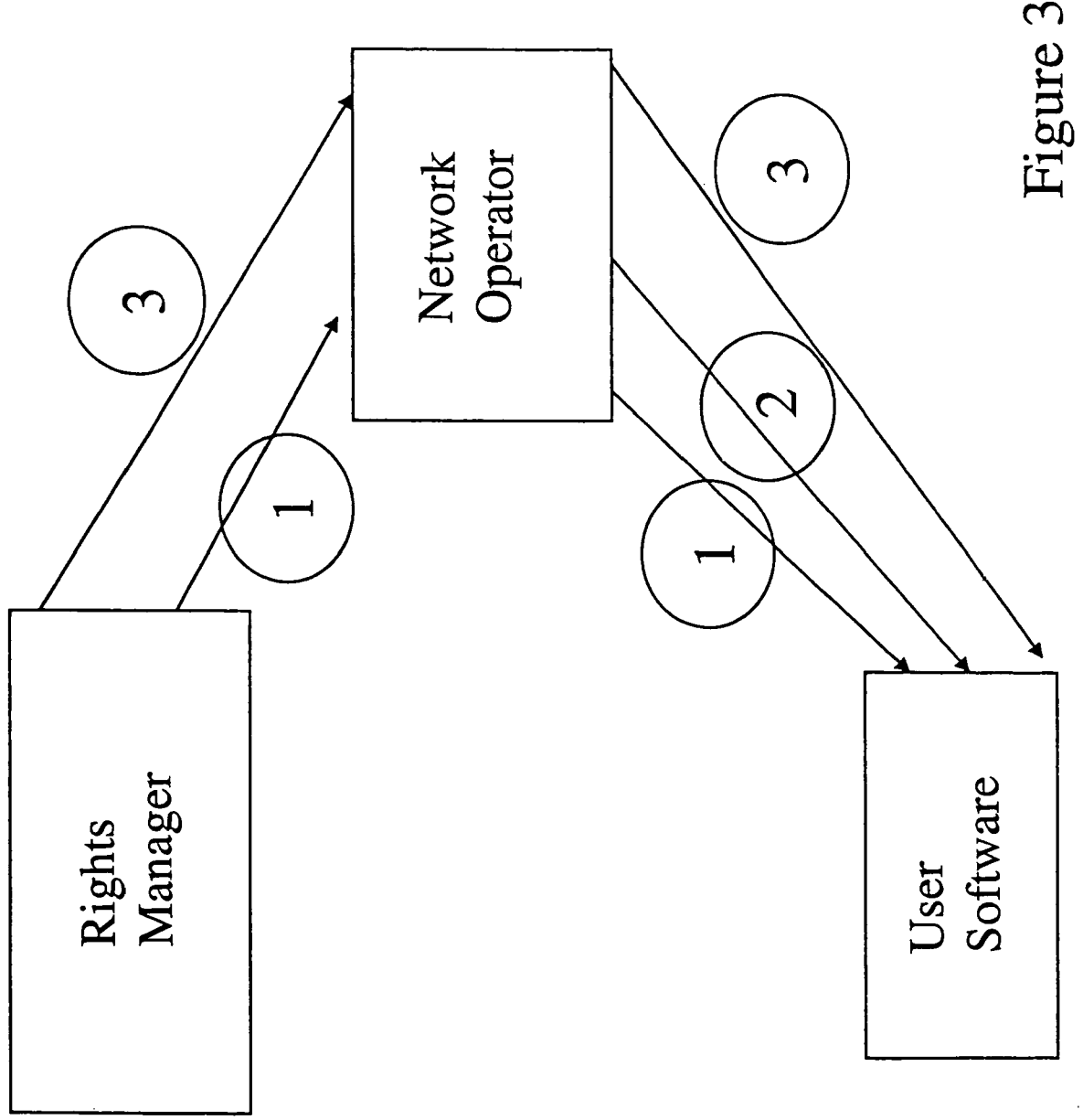

The method according to the invention is implemented in the system illustrated in Drawing 1. A specific software for consulting the content is installed on a client station. Information exchanges are made between this software and different servers. This arrangement is not the only possible arrangement: different functions can be located on a single server. The final objective is the consultation of content hosted on a dedicated server, this consultation being dependent of the address parameters and being made using the said specific software installed on the client station. In Drawing 1, the "C-RA" indicator means that the document is signed by the root key and the "C-RE" indicator means that the document is signed by the network key.

In our example embodiment, the digital certificate required to initialize a network includes the following fields:
the name of the computer network
a unique identifier
a relative validity duration
an expiration date
the operator's name
the operator's address
the type, description, reference, expiration date and license supplier, a URL leading to a Web help site colors of the addresses and of the address background of the computer network locations of "certificate", "topology" and "status" digital documents the length and exponent of the public key (for an RSA type encryption)

the public part of the network key and a "check print" of this key and finally a signature of the document by the root key.

In our example embodiment, the lookup file (address lookup) includes the following fields:

the name of the computer network a digital identifier a relative validity duration an expiration date an address of the content to be published a flag whether or not the content is on line an indication of a filter (for example: content exclusively for adults or not)

an address expiration date an indication about the user's authentication method a descriptor of the connection protocol the location of the content the location of a reference slide (home-slide)

the version and encoding of the content publication language indications about whether the content belongs to thematic channels, groups, families, etc.

and finally a signature of the document by the network key.

The possible step to update the specific software on the client station involves two digital documents: the status document and the update document. The status digital document (status) lists active versions of the software and the update digital document (update) contains the most recent version of the software. Three different statuses can be assigned in the status file:

up to date (OK)

expiration date is near (update recommended)

obsolete (update necessary).

When an address of the network is re-opened from the specific software, only certain steps will be executed depending on whether or not the certificate has expired, whether or not the topology has expired and then whether or not the lookup has expired in the cache.

Tables I and II indicate "who signs what document, and using which key" in two cases: the general case with delegation and the case without delegation.

TABLE I

Signature of digital documents in the general case: with delegation

| | Rights manager (signature using the root key) | Network operator (signature using the network key) |
|---|---|---|
| Setup document | YES | NO |
| Certificate document | YES | NO |
| Topology document | NO | YES |
| Lookup/error documents | NO | YES |
| Status document | YES | NO |
| Update document | YES | NO |

TABLE II

Signature of digital documents in the case without delegation

| | Rights manager (signature using the root key or the network key) | Network operator (has no key) |
|---|---|---|
| Setup document | YES (with the root key) | NO |
| Certificate document | YES (with the root key) | NO |
| Topology document | YES (with the network key) | NO |
| Lookup/error documents | YES (with the network key) | NO |
| Status document | YES (with the root key) | NO |
| Update document | YES (with the root key) | NO |

Drawings 2 and 3 show document exchange flows between servers hosting these documents and the user station, in the case of a public network and then in the case of a private network. Obviously, many other arrangements would be possible, for example some flows could be separated. In Drawings 2 and 3, flow reference 1 is the flow of the set-up and certificate documents, flow reference 2 is the flow of the topology and lookup/error documents and flow reference 3 is the flow of status and update documents.

The above description of the invention is given as an example. Obviously, those skilled in the art would be capable of making different variants of the invention without going outside the scope of the patent.

The invention claimed is:

1. A computer network operating method, the network comprising a plurality of lookup servers and a client station on which specific computer software is installed for accessing digital content, and connecting a rights manager and a network operator, the method comprising:

initializing the network using two digital documents signed by the rights manager using a root key, one being a digital certificate of the network and the other being a setup document including information used to access the digital certificate;

identifying network topology including:

obtaining a list of servers, the list including the plurality of lookup servers, recording a topology document including the list, the topology document being signed by at least one of the network operator and the rights manager using a network key, and assigning a coefficient to each server in the list that represents a processing capability of the server;

retrieving a digital document from a selected one of the list of servers, wherein in one operating condition the retrieved digital document is an error document intended for error management and in another operating condition the retrieved digital document is a lookup document including address parameters, the error and lookup documents being signed by at least one of the network operator and the rights manager using the network key;

selectively determining an address based on the lookup document; and selectively accessing digital content hosted at the address specified by the address parameters, using the specific computer software, wherein the digital certificate includes information that a user uses to access the network, including a public part of the network key.

2. The computer network operating method according to claim 1, further comprising installing the specific computer software for accessing digital content on the client station.

3. The computer network operating method according to claim 1, further comprising updating the specific computer software for accessing digital content on the client station, the updating being managed by a computer server using a status document and an update document, the status and update documents being signed by the rights manager using the root key and the status and update documents being specific to a platform of the client station.

4. The computer network operating method according to claim 1, further comprising providing a server dedicated to user technical assistance.

5. The computer network operating method according to claim 1, further comprising performing load balancing between the plurality of lookup servers.

6. The computer network operating method according to claim 1, further comprising using service re-assignment mechanisms when one of the plurality of lookup servers is unavailable.

7. The computer network operating method according to claim 1, wherein one of the address parameters is a digital filtering indicator taking into account content of corresponding digital content and managing authorization to access the content based on age of the user.

8. The computer network operating method according to claim 1, further comprising implementing a cache for accessing digital content on the client station.

9. The computer network operating method according to claim 8, wherein entries in the cache include at least one of two validity durations: a relative duration starting from a given event and an absolute duration corresponding to a predetermined expiration date.

10. The computer network operating method according to claim 9, wherein the event is loading of one of the digital documents.

11. The computer network operating method according to claim 1, wherein the list of servers includes indicators representing geographic locations of the servers.

12. The computer network operating method according to claim 1, wherein initializing the network is performed automatically using predetermined addresses.

13. The computer network operating method according to claim 1, wherein during the identifying network topology, the topology document is signed by the rights manager using the network key, the network key then being kept by the rights manager.

14. The computer network operating method according to claim 1, wherein during the looking up an address, the error and lookup documents are signed by the rights manager using the network key, the network key then being kept by the rights manager.

15. The computer network operating method according to claim 1, further comprising validating the public part of the network key by supplying a signature of a predetermined character string using the network key.

16. The computer network operating method according to claim 1, wherein each digital document includes a unique identifier determined partly by the rights manager and partly by the network operator.

17. The computer network operating method according to claim 15, wherein the signature is included in each digital document.

18. The computer network operating method according to claim 15, wherein, for each digital document, the signature is referenced by the digital document and is not included in the digital document.

19. The computer network operating method according to claim 1, wherein the address parameters define whether or not a user must authenticate in order to access a content, and if so, a manner of authentication to be used.

20. The computer network operating method according to claim 1, wherein the address parameters define a format of content to be published.

21. The computer network operating method according to claim 1, further comprising using different colors to display addresses corresponding to different networks.

22. The computer network operating method according to claim 1, wherein the lookup document includes a certificate to authenticate a content server.

23. The computer network operating method of claim 1, wherein digital data exchanged selectively comprises an address including a header corresponding to a name of the network and a descriptor determined by a content producer.

24. The computer network operating method according to claim 23, wherein, during the looking up an address, the digital data exchanged comprises the address including the header corresponding to the name of the network and the descriptor determined by the content producer.

25. The computer network operating method according to claim 1, wherein:
the digital certificate includes:
a name of the network,
a unique identifier,
at least one of a validity duration and an expiration date,
a name of the network operator, and
an address of the network operator, and
the lookup document includes:
the name of the network,
a digital identifier,
at least one of a validity duration and an expiration date,
an address of published content,
a flag indicating online availability of the published content,
a filter indicator,
an authentication indicator,
a connection protocol descriptor, and
an indicator specifying encoding of the published content.

26. The computer network operating method according to claim 1, wherein for each server in the list, the processing capability represents an ability of the server to respond to lookup requests.

27. The computer network operating method according to claim 1, wherein the topology, lookup, and error documents are signed by the network operator using the network key.

28. A computer network system comprising:
a rights manager that signs a digital certificate using a root key and that signs a setup document using the root key;
a plurality of lookup servers;
a client station, on which a specific software is installed for accessing digital content, that:
obtains the digital certificate based on the setup document;
obtains a topology document based on the digital certificate, wherein the topology document includes a list of the plurality of lookup servers, the client station being connected to the plurality of lookup servers over a network;

determines a selected server from the list;
retrieves one of an error document and a lookup document from the selected server, the error document intended for error management and the lookup document including address parameters, the error and lookup documents being signed by at least one of a network operator and the rights manager using a network key; and
accesses digital content hosted at a location specified by the address parameters.

29. The computer network system according to claim 28, wherein the list includes, for each of the plurality of lookup servers, a processing capability representing an ability of the lookup server to respond to lookup requests.

30. The computer network system according to claim 28, wherein the topology, lookup, and error documents are signed by the network operator using the network key.

31. A method of operating a network, comprising:
initializing the network using two documents signed by a rights manager using a root key, one being a digital certificate of the network and the other being a setup document including information used to access the digital certificate, the digital certificate including a public part of a network key, which a user uses to access the network;
obtaining a list of servers, wherein the servers function as lookup servers;
assigning a coefficient representing respective processing capability to each server in the list;
recording a topology document including the list and the coefficients, the topology document being signed by at least one of the rights manager and a network operator using the network key;
obtaining the digital certificate based on the setup document;
obtaining the topology document based on the digital certificate;
determining a selected server from the list of servers based on the topology document;
requesting an address using the selected server, wherein in one operating condition, the selected server returns an error document for error management and in another operating condition, the selected server returns a lookup document including address parameters, the error and lookup documents being signed by at least one of the rights manager and the network operator using the network key;
selectively determining the address based on the lookup document; and
selectively accessing digital content hosted at the address specified by the address parameters.

32. The method according to claim 31, wherein:
the digital certificate includes:
a name of the network,
a unique identifier,
at least one of a validity duration and an expiration date,
a name of the network operator, and
an address of the network operator, and
the lookup document includes:
the name of the network,
a digital identifier,
at least one of a validity duration and an expiration date,
an address of published content,
a flag indicating online availability of the published content,
a filter indicator,
an authentication indicator,
a connection protocol descriptor, and
an indicator specifying encoding of the published content.

33. The method according to claim 31, wherein, for each server in the list, the processing capability represents an ability of the server to respond to lookup requests.

34. The method according to claim 31, wherein the topology, lookup, and error documents are signed by the network operator using the network key.

* * * * *